(12) United States Patent
Cheng et al.

(10) Patent No.: US 8,466,383 B2
(45) Date of Patent: Jun. 18, 2013

(54) ILLUMINANT HUMAN INTERFACE DEVICE

(75) Inventors: Shan Liang Cheng, Taipei (TW); Li Lun Liu, Taipei (TW); Min Hua Chen, Taipei (TW); Chao Yi Chen, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 418 days.

(21) Appl. No.: 12/888,212

(22) Filed: Sep. 22, 2010

(65) Prior Publication Data

US 2012/0070218 A1    Mar. 22, 2012

(51) Int. Cl.
*H01H 9/00* (2006.01)

(52) U.S. Cl.
USPC .......................................... 200/314

(58) Field of Classification Search
USPC .......................................... 200/314
See application file for complete search history.

(56) References Cited

U.S. PATENT DOCUMENTS

| | | | | |
|---|---|---|---|---|
| 4,882,581 A | * | 11/1989 | Inobe et al. | 341/22 |
| 5,655,826 A | * | 8/1997 | Kouno et al. | 362/24 |
| 6,710,269 B2 | * | 3/2004 | Kunigkeit et al. | 200/5 A |
| 8,168,905 B2 | * | 5/2012 | Yang | 200/314 |
| 2010/0258420 A1 | * | 10/2010 | Tsai et al. | 200/314 |

* cited by examiner

*Primary Examiner* — Edwin A. Leon
*Assistant Examiner* — Lheiren Mae Caroc

(57) ABSTRACT

A keyboard structure includes a light guide plate, a circuit board and a key sheet sequentially disposed on a reflecting sheet. A plurality of scattering and reflection points is located under the light guide plate and at least one light-emitting element on one side of the light guide plate. The key sheet has a one-piece formed body and a plurality of pressing portions. The plurality of pressing portions may be actuated to shift and conduct a sensor on the circuit board. Each pressing portion further has a light transmissive area. A light ray emitted by the light-emitting element passes through the light guide plate, and is reflected by the reflecting sheet to the light guide plate and the key sheet. Then, the light ray comes out of the key sheet through the light transmissive areas of the pressing portions.

7 Claims, 3 Drawing Sheets

ILLUMINANT HUMAN INTERFACE DEVICE

BACKGROUND OF THE INVENTION

1. Field of Invention

The present invention relates to a keyboard structure, and more particularly to a luminant keyboard structure.

2. Related Art

Keyboards are commonly seen in the peripheral input devices of electronic products like computers, cell phones or personal digital assistants (PDAs) to serve as the operation media for the user to input control commands to the electronic products.

Generally speaking, in the assembly of the keyboard, a circuit board and a plurality of sensors disposed on the circuit board are usually disposed in a casing, and a plurality of key structures exposed outside the casing is disposed on the plurality of sensors. Each key structure further comprises an elastic member, a support member, and a key cap. The elastic member is disposed on the sensor of the circuit board, and the support member is sleeved on the elastic member. The support member is a scissor structure composed of two brackets which are crossed and may rotate relative to each other. One end of the two brackets is connected to the key cap, and the other end is supported on the circuit board, such that the key cap is pushed by the support member to suspend above the circuit board. Therefore, when the user exerts an external force to press the key cap, the two brackets are overlapped, such that the key cap compresses the elastic member to trigger the sensor to complete the input operation of the control commands. Moreover, after the external force exerted by the user is released, the key cap under the rebound resilience of the elastic member drives the two brackets to return to the initial state.

However, the components of this key structure are complicated, which need much manpower and time to assemble the key structure in the assembling and manufacturing process of the keyboard and further causes the problem that the manufacturing cost of keyboard is extremely high. Furthermore, after the assembly of the scissor-type key structure, two neighboring key structures have slits therebetween, and thus dusts and moisture may enter the casing through the slits to cause the damage of other electronic components in the casing.

Furthermore, in addition to the complicated assembly of the traditional keyboard, since the keyboard does not have a luminant device design like the key structure, the keyboard is not suitable for the user to operate in different light brightness like in the dark room or in the vehicle, and the user cannot clearly identify the function and attribute of each key structure, but has to search for them on the keyboard based on the operation experience, which may result in the electronic devices take wrong actions due to the error of input instructions and is quite inconvenience in practical use.

SUMMARY OF THE INVENTION

In view of the above problems, the present invention is a keyboard structure, for solving the problems that the components of the key structure of the conventional keyboard are too complicated and the conventional keyboard is not suitable for the environment of low light brightness.

The present invention provides a keyboard structure, which comprises a reflecting sheet, a light guide plate, a plurality of scattering and reflection points, a circuit board, a key sheet, and at least one light-emitting element. The light guide plate is disposed on the reflecting sheet, and the plurality of scattering and reflection points is attached below the light guide plate and located between the reflecting sheet and the light guide plate. The circuit board is disposed on the light guide plate, and a plurality of sensors is electrically disposed on the circuit board for conducting signals to the system so as to perform instructions or character identification. The key sheet is disposed on the circuit board, and has a one-piece formed body and a plurality of pressing portions. The pressing portions protrude from one side of the body away from the circuit board, and the key sheet contacts the circuit board by the body, such that the plurality of pressing portions are normally suspended above the plurality of sensors.

Each pressing portion further has a light transmissive area. The plurality of pressing portions is actuated to shift, and the conducting portion below each pressing portion triggers the corresponding sensor. The light-emitting element is adjacent to the light guide plate, and the light-emitting element emits a light ray to the light guide plate. The light ray passes through the light guide plate, the reflecting sheet, and the plurality of scattering and reflection points to the key sheet, and then comes out of the key sheet through the light transmissive areas of the pressing portions.

The present invention has the effects that the body and pressing portions of the key sheet are one-piece formed, so the procedure of assembling the key sheet on the keyboard structure is simplified. At the same time, the light-emitting element is disposed, which allows the user to use in the environment of different light ray brightness, e.g. the environment of dim light ray and the keyboard operation without restrictions, so the feasibility of the keyboard structure is improved.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
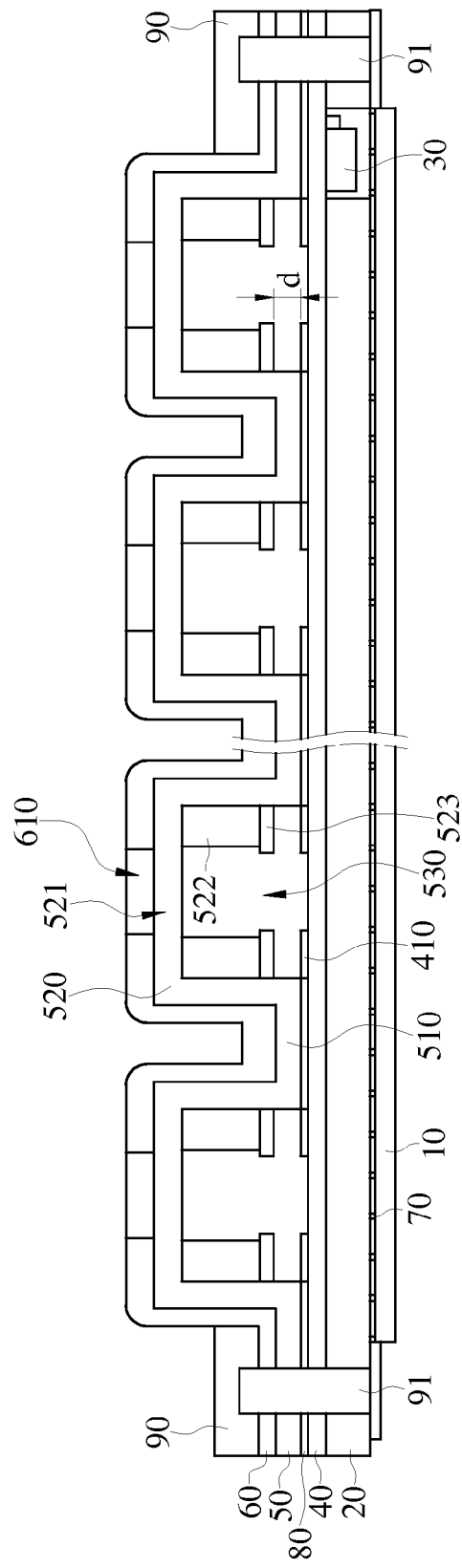
FIG. 1 is a schematic cross-sectional view of a first embodiment of the present invention.

As shown in FIG. 1, the keyboard structure according to the first embodiment of the present invention comprises a reflecting sheet 10, a light guide plate 20, at least one light-emitting element 30, a circuit board 40, a key sheet 50, and a protection layer 60. The light guide plate 20 is disposed on the reflecting sheet 10, and a plurality of scattering and reflection points 70 is disposed between the reflecting sheet 10 and the light guide plate 20.

The scattering and reflection points 70 may be selectively distributed on one side of the reflecting sheet 10 facing the light guide plate 20 or on one side of the light guide plate 20 facing the reflecting sheet 10 by printing, etching, or injection molding. This is only a different manner of disposing the plurality of scattering and reflection points 70 between the reflecting sheet 10 and the light guide plate 20, but the present invention is not limited herein. Furthermore, the plurality of scattering and reflection points 70 form reflection points between the reflecting sheet 10 and the light guide plate 20, such that the light ray produced by the light-emitting element 30 after passing through the light guide plate 20 may be reflected outside the keyboard structure by the plurality of scattering and reflection points 70.

The light-emitting element 30 is electrically connected to the circuit board 40 in the form of a lamp tube or a light emitting diode (LED). When the circuit board 40 is disposed on one side of the light guide plate 20 away from the reflecting sheet 10, the light-emitting element 30 is located between the circuit board 40 and the reflecting sheet 10 and is adjacent to the edge of the light guide plate 20, such that the light ray produced by the light-emitting element 30 may be delivered to the reflecting sheet 10 and the plurality of scattering and reflection points 70 by the light guide plate 20. The circuit board 40 is a transparent flexible circuit board (e.g. membrane circuit board) disposed on the light guide plate 20, and a plurality of sensors 410 is electrically disposed on the circuit board 40.

The key sheet 50 is disposed on the circuit board 40, and the key sheet 50 may be bonded on the circuit board 40 selectively by an adhesion layer 80 formed of the adhesive substance like the double-sided adhesive tape or adhesive glue so as to enhance the bonding strength of the key sheet 50 and the circuit board 40. The key sheet 50 is formed of a transparent material, like the plastic, rubber or silica having the light transmissive property. The key sheet 50 has a one-piece formed body 510 and a plurality of pressing portions 520, and the pressing portions 520 protrude from one side of the body 510. Therefore, when the key sheet 50 is disposed on the circuit board 40, the key sheet 50 is bonded on the circuit board 40 by the body 510, such that the plurality of pressing portions 520 protrudes from the circuit board 40 and forms an accommodation space 530 with the circuit board 40.

Referring to FIG. 1, the plurality of pressing portions 520 respectively corresponds to the plurality of sensors 410, and the plurality of pressing portions 520 is normally suspended above the plurality of sensors 410. Each pressing portion 520 further has a light transmissive area 521 and a conducting element support structure 522. The light transmissive area 521 corresponds to the light guide plate 20, and the conducting element support structure 522 is disposed surrounding the light transmissive area 521 in the accommodation space 530, such that the light ray produced by the light-emitting element 30 after reflected by the plurality of scattering and reflection points 70 may come out of the keyboard structure through the light transmissive areas 521 without being blocked by the conducting element support structures 522.

The conducting element support structure 522 and the pressing portions 520 may be one-piece formed on the key sheet 50. Alternatively, the conducting element support structure 522 is made of a conductive material, and may be disposed in the accommodation space 530 in any suitable bonding manner and is connected to the pressing portions 520. The conducting element support structure 522 has a conducting portion 523, the conducting portion 523 corresponds to the sensor 410 of the circuit board 40, and is spaced at a distance d from the sensor 410, such that the pressing portions 520 when pressed by the user may provide the action travel for the conducting portion 523 to electrically contact the sensor 410.

As shown in FIG. 1, the protection layer 60 is disposed on the key sheet 50, and the protection layer 60 may be, but not limited to, black lacquer coated or sprayed on the surface of the key sheet 50. A plurality of light transmission holes 610 is disposed on the protection layer 60, and the light transmission holes 610 respectively correspond to the light transmissive areas 521 of the pressing portions 520. For example, the light transmission holes 610 in the form of a letter and/or symbol graphic are cut at the position corresponding to each light transmissive area 521 on the protection layer 60 in a manner of laser marking, such that the light ray reflected by the plurality of scattering and reflection points 70 may come out of the protection layer 60 through the light transmission holes 610, such that the light transmission holes 610 may present a bright letter or symbol graphic on each pressing portion 520, for the user to identify and press.

Furthermore, a frame 90 may be selectively disposed on the protection layer 60. The frame 90 is laminated on the edge of the protection layer 60, and meanwhile a fixing member 91, like a screw or bolt, passes through the reflecting sheet 10, the light guide plate 20, the adhesion layer 80, the circuit board 40, the key sheet 50 and the protection layer 60 sequentially, and is locked on the frame 90, such that the above elements are bound as a whole, and the closely binding of the frame 90 and the fixing member 91 may prevent moisture from entering into the keyboard structure to cause the damage of the keyboard structure.

Based on the above keyboard structure, when the user operates the keyboard structure, the light-emitting element 30 produces a light ray, and the light ray passes through the light guide plate 20 to be delivered to the reflecting sheet 10 and the plurality of scattering and reflection points 70. Thereafter, the light ray is reflected by the reflecting sheet 10 and the plurality of scattering and reflection points 70 to be projected on the light transmissive area 521 of each pressing portions 520. After passing through the light transmissive area 521, the light ray is delivered outside the keyboard structure through the light transmission holes 610 of the protection layer 60, and thus the light transmission holes 610 form the bright letter and/or symbol graphic on the keyboard structure.

At this time, the user may clearly identify the position of each pressing portion 520 on the keyboard structure and the letter or symbol graphic corresponding to the pressing portion 520, and may selectively press the pressing portions 520. The conducting element support structure 522 of the pressing portion 520 electrically contacts the sensor 410 of the circuit board 40 by the conducting portion 523, so as to trigger the sensor 410 to execute the corresponding input instruction. After the external force exerted on the pressing portion 520 is released, the pressing portion 520 may be suspended above the sensor 410 again based on the rebound resilience of the material of the key sheet 50, such that the conducting portion 523 is separated from the sensor 410 and the pressing operation of the user is over.

Figure 2:
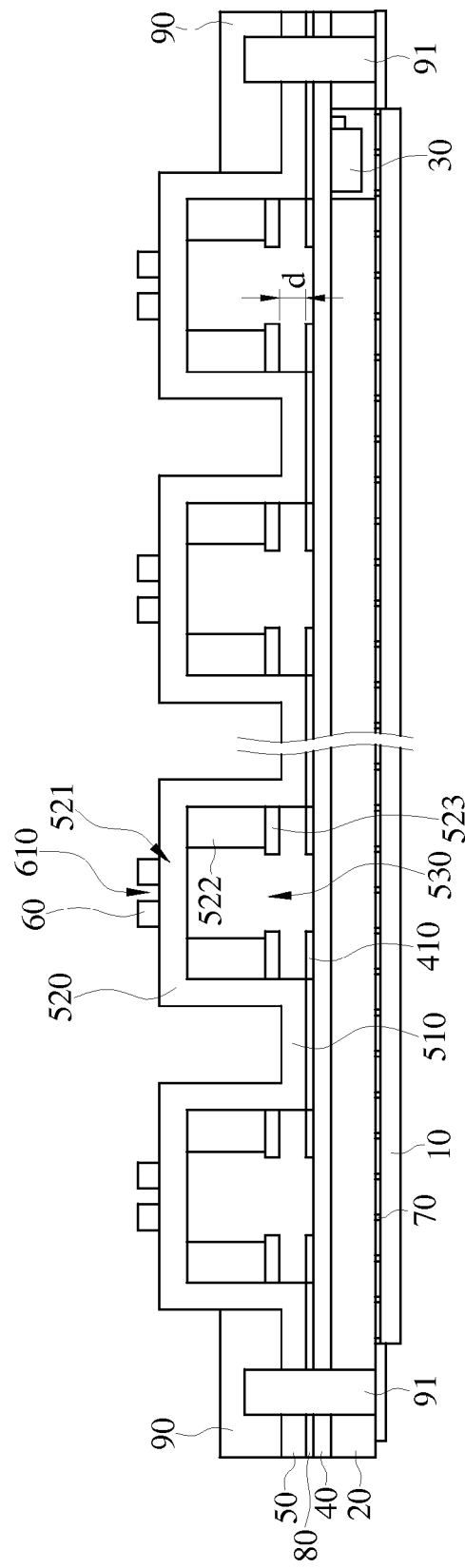
FIG. 2 is a schematic cross-sectional view of a second embodiment of the present invention.

Moreover, to enable the user to clearly identify the input instruction corresponding to each pressing portion on the key sheet, in addition to the first embodiment in which the light transmission holes present the letter or symbol graphic of each pressing portion, as shown in FIG. 2, in a second embodiment of the present invention, the protection layer 60 is disposed on the light transmissive areas 521 of the pressing portions 520, and is directly arranged into the letter or symbol graphic. Therefore, when the light ray goes to the ambient environment through the light transmissive areas 521 and the light transmission holes 610 of the protection layer 60, the light ray illuminates the protection layer 60 around the protection layer 60, and thus the user may clearly identify the letter or symbol graphic of each pressing portion 520.

Figure 3:
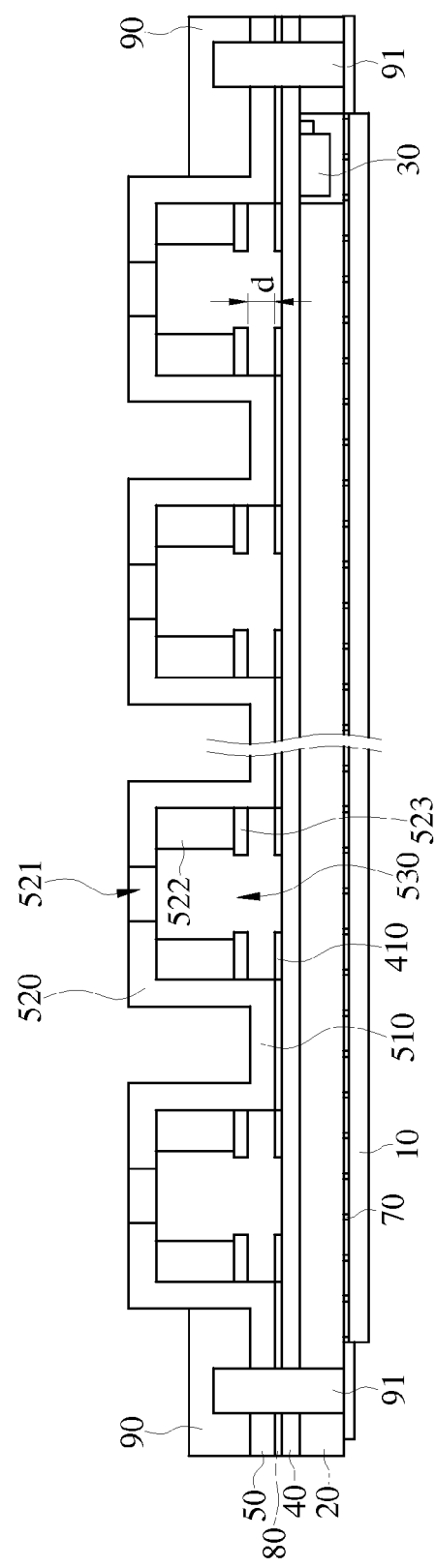
FIG. 3 is a schematic cross-sectional view of a third embodiment of the present invention.

Alternatively, the keyboard structure according to a third embodiment of the present invention as shown in FIG. 3 may adopt a key sheet 50 made of an opaque material, and the protection layer is not disposed. Meanwhile, a hollow light transmissive area 521 is cut on the pressing portion 520 by laser marking, and the light transmissive area 521 of each pressing portion 520 has different letters or symbol graphics. Therefore, after the light ray produced by the light-emitting element 30 is reflected by the plurality of scattering and reflection points 70, the light ray may directly come out of the key sheet 50 through the light transmissive area 521, and further produce the bright letter or symbol graphic on each pressing portion 520 for the user to identify and operate.

The effects of the present invention lie in that the key sheet is composed of the one-piece formed body and the plurality of pressing portions, so in the assembly of the keyboard structure, the operator just dispose the single key sheet on the circuit board to finish the disposing of the keys, which simplifies the assembling procedure of the keyboard structure. Besides, the one-piece formed pressing portions may prevent dusts and moisture and thus form the man-machine interface with more reliable functions.

Moreover, the bright letter or graphic presented on the pressing portions by the light ray produced by the light-emitting element allows the user to press to input instructions under the guidance of the light rays in the dark or dim environment, such that the keyboard structure will not be easily influenced by the ambient brightness and the feasibility of the keyboard structure is improved.

What is claimed is:

1. A keyboard structure, comprising:
   a reflecting sheet;
   a light guide plate, disposed on the reflecting sheet;
   a plurality of scattering and reflection points, disposed between the reflecting sheet and the light guide plate;
   a circuit board, disposed on the light guide plate and having a plurality of sensors electrically disposed thereon;
   a key sheet, disposed on the circuit board and having a one-piece formed body and a plurality of pressing portions, wherein the pressing portions protrude from one side of the body away from the circuit board, the body contacts the circuit board, the pressing portions are normally suspended above the sensors, and each of the pressing portions further has a light transmissive area, the pressing portions are actuated to shift and trigger the corresponding sensor;
   at least one light-emitting element, adjacent to the light guide plate, wherein the light-emitting element emits a light ray to the light guide plate, the light ray passes through the light guide plate to the scattering and reflection points and the reflecting sheet, is reflected by the reflecting sheet and the scattering and reflection points to the key sheet, and then comes out of the key sheet through the light transmissive areas;
   at least one fixing member penetrating the reflecting sheet, the light guide plate, the circuit board, and the key sheet sequentially, so as to bind the reflecting sheet, the light guide plate, the circuit board, and the key sheet as a whole; and
   a frame laminated on the key sheet, wherein the frame corresponds to the fixing member, and the fixing member is locked on the frame.

2. The keyboard structure according to claim 1, further comprising a protection layer disposed on one side of the key sheet away from the circuit board, wherein the protection layer has a plurality of light transmission holes, the light transmission holes respectively correspond to the light transmissive areas of the pressing portions, and the light ray comes out of the protection layer through the light transmission holes.

3. The keyboard structure according to claim 2, wherein the light transmission holes form a letter or symbol graphic on the light transmissive areas.

4. The keyboard structure according to claim 1, further comprising an adhesion layer between the body and the circuit board, wherein the key sheet is bonded on the circuit board by the adhesion layer.

5. The keyboard structure according to claim 1, wherein the circuit board is a membrane circuit board.

6. The keyboard structure according to claim 1, wherein each of the pressing portions has a conducting element support structure, the pressing portions electrically contact the sensors and trigger the sensors through the conducting element support structures.

7. The keyboard structure according to claim 6, wherein the conducting element support structure has a conducting portion, the conducting portion corresponds to one of the sensors, and the conducting element support structure electrically contacts the corresponding sensor through the conducting portion.

* * * * *